US012574647B2

(12) United States Patent
Bhat et al.

(10) Patent No.: US 12,574,647 B2
(45) Date of Patent: *Mar. 10, 2026

(54) SYSTEM AND METHOD FOR ACQUIRING IMAGES OF A TARGET AREA FROM AN AERIAL VEHICLE

(71) Applicant: IDEAFORGE TECHNOLOGY LIMITED, Maharashtra (IN)

(72) Inventors: Ashish Bhat, Maharashtra (IN); Ankit Mehta, Maharashtra (IN); Rahul Singh, Maharashtra (IN); Sai Sumanth Manchukonda, Maharashtra (IN)

(73) Assignee: IDEAFORGE TECHNOLOGY LIMITED, Maharashtra (IN)

( * ) Notice: Subject to any disclaimer, the term of this patent is extended or adjusted under 35 U.S.C. 154(b) by 55 days.

This patent is subject to a terminal disclaimer.

(21) Appl. No.: 18/512,631

(22) Filed: Nov. 17, 2023

(65) Prior Publication Data

US 2024/0089602 A1 Mar. 14, 2024

Related U.S. Application Data

(63) Continuation-in-part of application No. 17/457,321, filed on Dec. 2, 2021, now Pat. No. 12,108,156,
(Continued)

(30) Foreign Application Priority Data

Nov. 30, 2017 (IN) .............................. 201721043086

(51) Int. Cl.
*H04N 23/695* (2023.01)
*B64U 101/00* (2023.01)
(Continued)

(52) U.S. Cl.
CPC ......... *H04N 23/695* (2023.01); *H04N 23/698* (2023.01); *B64U 2101/00* (2023.01); *B64U 2101/30* (2023.01)

(58) Field of Classification Search
CPC .... H04N 23/695; H04N 23/698; H04N 23/66; H04N 7/185; B64U 2101/00;
(Continued)

(56) References Cited

U.S. PATENT DOCUMENTS 8,687,062 B1 4/2014 Reece
9,179,064 B1 11/2015 McClatchie et al.
(Continued)

FOREIGN PATENT DOCUMENTS

CN 105629980 A 6/2016
CN 106296816 A 1/2017

OTHER PUBLICATIONS

PCT International Search Report and Written Opinion for International Application No. PCT/IB2018/059512, entitled "Method for Acquiring Images Having Unidirectional Distortion From an Aerial Vehicle for 3d Image Reconstruction," mailed on Aug. 3, 2019.
(Continued)

*Primary Examiner* — Nasim N Nirjhar
(74) *Attorney, Agent, or Firm* — Hamilton, Brook, Smith & Reynolds, P.C.

(57) ABSTRACT

A method for capturing videos and/or images of a target area using a single camera configured with an aerial vehicle (AV) is disclosed including the steps of moving the AV over the area of interest along a straight path; capturing a first set of images of an area down below by pointing an optical axis of the camera towards a first side of the straight path such that the optical axis makes a first set of predefined angles with vertical; and capturing a second set of images of the area down below by pointing the optical axis of the camera
(Continued)

towards a second side of the straight path such that the optical axis makes a second set of predefined angles with respect to the vertical. Side overlap between the first and second set of images is optimized to account for error in camera movement.

22 Claims, 9 Drawing Sheets

Related U.S. Application Data which is a continuation-in-part of application No. 16/768,244, filed as application No. PCT/IB2018/059512 on Nov. 30, 2018, now Pat. No. 11,375,111.

(51) Int. Cl.
   *B64U 101/30* (2023.01)
   *H04N 23/698* (2023.01)
(58) Field of Classification Search
   CPC ............ B64U 2101/30; B64U 2101/40; G05D 1/243; G05D 1/43; G05D 1/648; G05D 2105/87; G05D 2109/254; G05D 2111/10; G05D 1/689
   See application file for complete search history.

(56) References Cited

U.S. PATENT DOCUMENTS

| | | | |
|---|---|---|---|
| 11,348,265 | B1 | 5/2022 | Nielsen et al. |
| 11,375,111 | B2 | 6/2022 | Mehta et al. |
| 12,108,156 | B2 | 10/2024 | Bhat et al. |
| 2004/0173726 | A1 | 9/2004 | Mercadal et al. |
| 2014/0316616 | A1 | 10/2014 | Kugelmass |
| 2016/0239976 | A1 | 8/2016 | Fathi et al. |
| 2018/0316858 | A1 | 11/2018 | Matsumoto |
| 2019/0094888 | A1* | 3/2019 | Hiroi ...................... G05D 1/106 |
| 2019/0130630 | A1 | 5/2019 | Ackerson et al. |
| 2019/0344890 | A1* | 11/2019 | Loveland ................ G06T 17/00 |
| 2020/0027243 | A1 | 1/2020 | Ziegler et al. |
| 2020/0221056 | A1 | 7/2020 | Cao et al. |
| 2021/0208488 | A1* | 7/2021 | Qian ...................... F16M 13/00 |
| 2022/0094856 | A1 | 3/2022 | Bhat et al. |

OTHER PUBLICATIONS

PCT International Preliminary Report on Patentability for International Application No. PCT/IB2018/059512, entitled "Method for Acquiring Images Having Unidirectional Distortion From an Aerial Vehicle for 3d Image Reconstruction," mailed on Jun. 11, 2020.

Office Action for U.S. Appl. No. 16/768,244 "Method for Acquiring Images Having Unidirectional Distortion From an Aerial Vehicle for 3d Image Reconstruction" dated Jun. 2, 2021.

Final Office Action for U.S. Appl. No. 16/768,244 "Method for Acquiring Images Having Unidirectional Distortion From an Aerial Vehicle for 3d Image Reconstruction" dated Aug. 25, 2021.

Notice of Allowance and Fees Due for U.S. Appl. No. 16/768,244 "Method for Acquiring Images Having Unidirectional Distortion From an Aerial Vehicle for 3d Image Reconstruction" dated Apr. 12, 2022.

Office Action for U.S. Appl. No. 17/457,321 "A System and Method for Acquiring Images From an Aerial Vehicle for 2D/3D Digital Model Generationn" dated Apr. 14, 2023.

Final Office Action for U.S. Appl. No. 17/457,321 "A System and Method for Acquiring Images From an Aerial Vehicle for 2D/3D Digital Model Generationn" dated Sep. 1, 2023.

Non-Final Rejection Mailed on Feb. 2, 2024 for U.S. Appl. No. 17/457,321, 34 page(s).

Notice of Allowance and Fees Due (PTOL-85) Mailed on Jun. 10, 2024 for U.S. Appl. No. 17/457,321, 8 page(s).

* cited by examiner

202

204

W

Z-AXIS

302

OSCILLATING CAMERA FIXED TO A UAV $-\delta/2$   $\delta/2$

P2     P1

GROUND

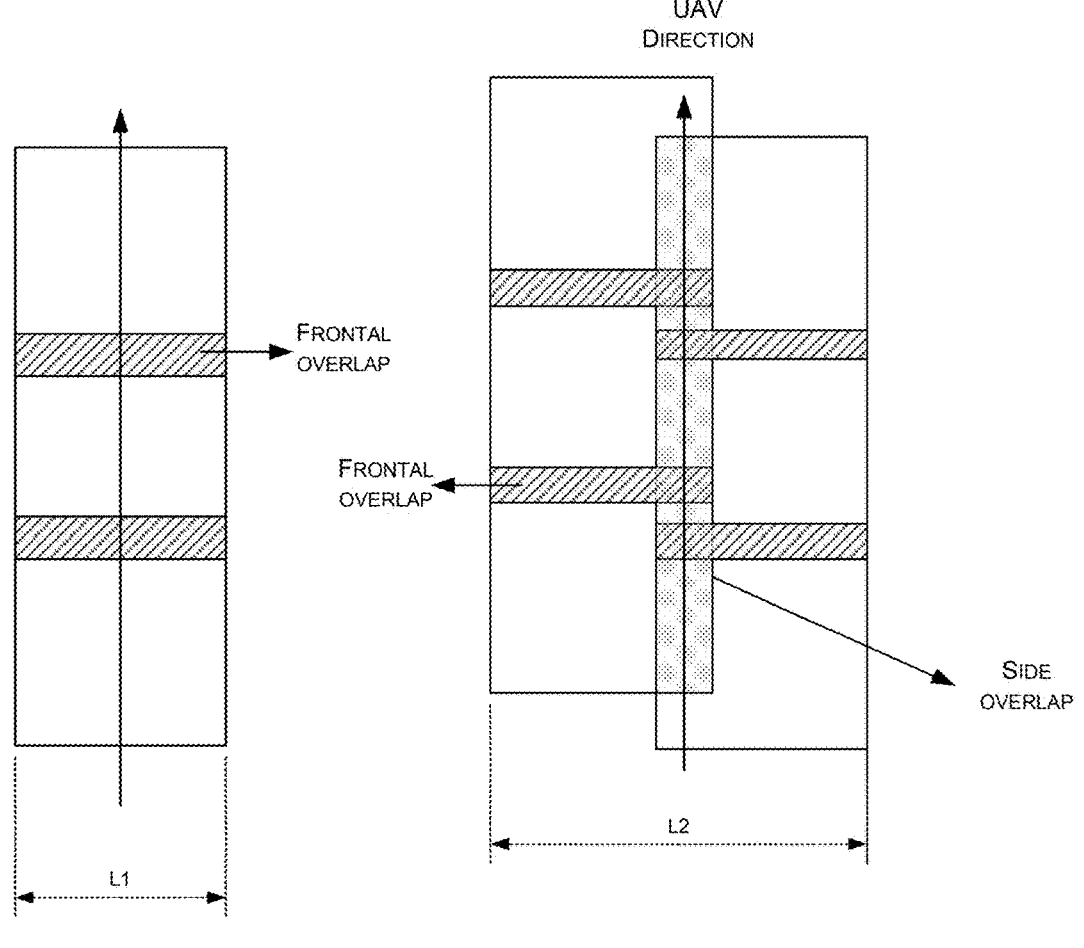
FIG. 4A                    FIG. 4B
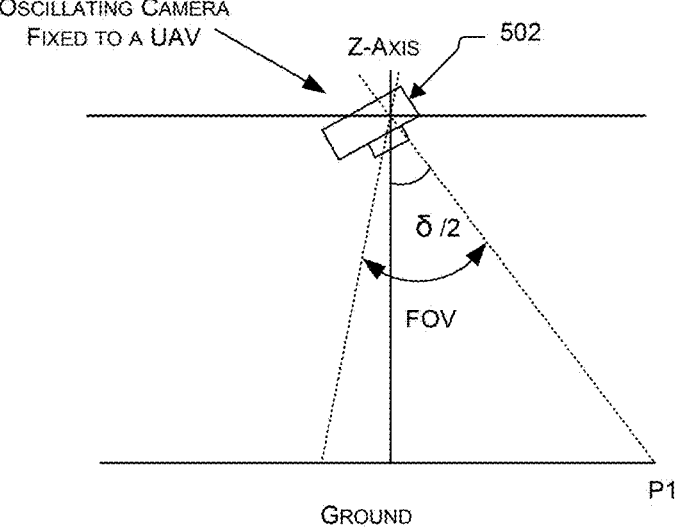
FIG. 5A

608

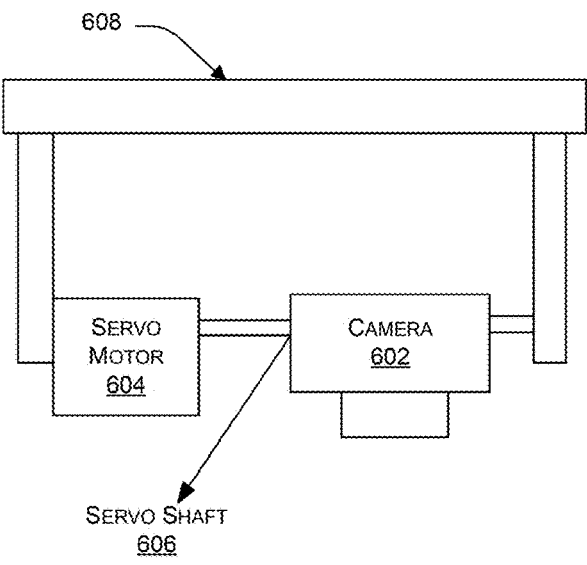

SERVO
MOTOR
604

CAMERA
602

SERVO SHAFT
606

FIG. 6

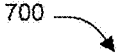

700

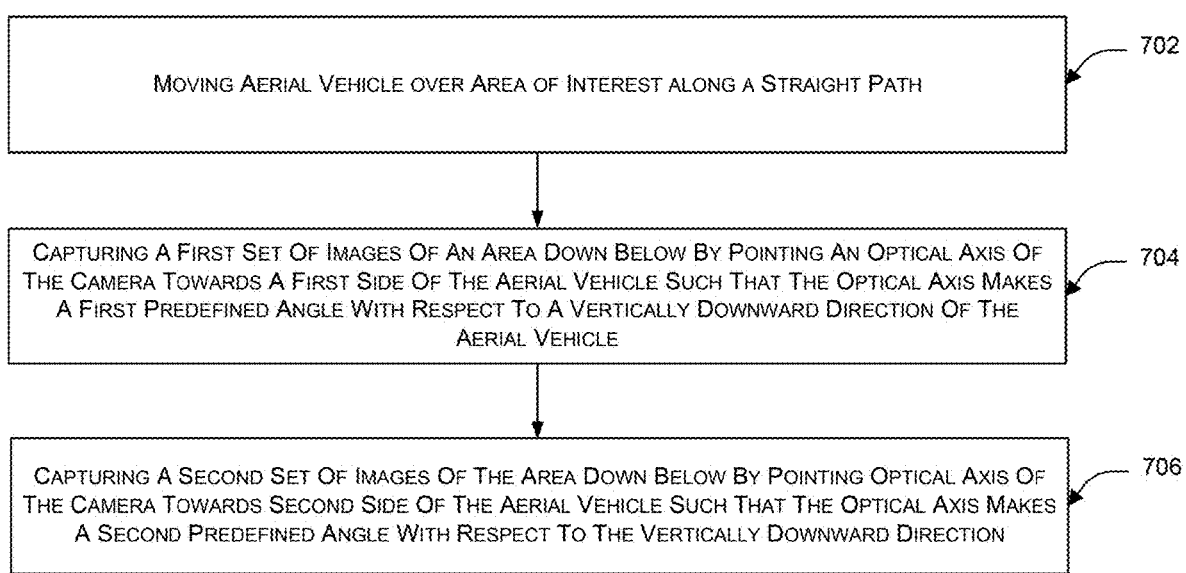

MOVING AERIAL VEHICLE OVER AREA OF INTEREST ALONG A STRAIGHT PATH                    702

CAPTURING A FIRST SET OF IMAGES OF AN AREA DOWN BELOW BY POINTING AN OPTICAL AXIS OF
THE CAMERA TOWARDS A FIRST SIDE OF THE AERIAL VEHICLE SUCH THAT THE OPTICAL AXIS MAKES         704
A FIRST PREDEFINED ANGLE WITH RESPECT TO A VERTICALLY DOWNWARD DIRECTION OF THE
AERIAL VEHICLE

CAPTURING A SECOND SET OF IMAGES OF THE AREA DOWN BELOW BY POINTING OPTICAL AXIS OF
THE CAMERA TOWARDS SECOND SIDE OF THE AERIAL VEHICLE SUCH THAT THE OPTICAL AXIS MAKES         706
A SECOND PREDEFINED ANGLE WITH RESPECT TO THE VERTICALLY DOWNWARD DIRECTION

FIG. 7

SYSTEM AND METHOD FOR ACQUIRING IMAGES OF A TARGET AREA FROM AN AERIAL VEHICLE

RELATED APPLICATIONS

This application is a continuation-in-part of U.S. application Ser. No. 17/457,321, filed Dec. 2, 2021, which is a continuation-in-part of U.S. application Ser. No. 16/768,244, filed May 29, 2020, now U.S. Pat. No. 11,375,111, issued Jun. 28, 2022, which is the U.S. National Stage of International Application No. PCT/IB2018/059512, filed Nov. 30, 2018 which designates the U.S., published in English, and claims priority under 35 U.S.C. § 119 or 365(c) to Indian Application No. 201721043086 filed on Nov. 30, 2017. The entire teachings of the above Applications are incorporated herein by reference.

TECHNICAL FIELD

The present disclosure relates to field of image optics. In particular, the present disclosure pertains to a system and a method for capturing videos and acquiring images for a target area, for example, a large target area from an aerial vehicle.

BACKGROUND

Background description includes information that may be useful in understanding the present invention. It is not an admission that any of the information provided herein is prior art or relevant to the presently claimed invention, or that any publication specifically or implicitly referenced is prior art.

In aerial imaging, unmanned aerial vehicles (UAV) are equipped with cameras to capture images of an area for mapping. Cameras have a fixed field of view and based on the field of view of camera, lens, resolutions, frontal and side overlap requirement and altitude; the ground area captured in a single photo is limited. This in turn increases the time spent by the UAV on the area for image capturing to make a detailed area map. Wide-angled field of view cameras can be used with UAVs for fast area mapping but they are generally low resolution with lesser pixels per image, leading to grainy and blurred images. Even though the wide-angled approach would provide a larger field of view in one shot, the associated image quality deterioration is undesirable.

In order to overcome this problem, many prior-art techniques make use of an aerial camera system with more than one camera of which each camera is directed towards a unique area on the ground to provide a large field of view in which the captured images are then overlapped. But such techniques also increase the payload weight of the UAV in turn reducing the UAV flight.

Prior art references have dealt with problem of capturing images of land mass over large areas. For example, U.S. Pat. No. 8,687,062B1 discloses an aerial camera system comprising: a camera cluster, including a plurality of cameras, each camera orientated in a direction selected from a plurality of different directions. It further incorporates one or more rotators that rotate the camera cluster about respective one or more axes in response to one or more signals from a control module. The cited reference also discloses a method of controlling the disclosed camera cluster to capture images, which involves rotation of the camera cluster about a vertical axis (i.e. pan axis) and a horizontal axis. The disclosed camera system and method of capturing images requires a plurality of cameras increasing the weight of the camera system which is not a feasible solution for an aerial platform like UAV.

Therefore, there is a need in the art to present a method that not only provides better resolution and field of view for imaging applications during the flight path of the UAV but also provides optimum overlapping of captured images to ensure maximum coverage of the ground area and capturing the same in the resultant stitched image for high quality image construction with a single camera.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

The recitation of ranges of values herein is merely intended to serve as a shorthand method of referring individually to each separate value falling within the range. Unless otherwise indicated herein, each individual value is incorporated into the specification as if it were individually recited herein.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

OBJECTS OF THE PRESENT DISCLOSURE

It is an object of the present disclosure to provide an economical and simple to implement method for capturing videos and acquiring images of a target area from an aerial platform.

It is another object of the present disclosure to provide a system and method for capturing videos and acquiring images of a target area with a single camera by moving the camera along the flight path adapted to cover the entire area of interest.

It is another object of the present disclosure to provide an economical and simple to implement method for capturing videos and acquiring images of a target area from an aerial platform with a single camera.

It is another object of the present disclosure to provide a system and method for capturing videos and images along an axis perpendicular to the flight path of the aerial vehicle.

It is an object of the present disclosure to provide a system and method for capturing videos and images that reduce the flight time of the UAV for mapping a target area.

SUMMARY

The present disclosure relates to field of image optics. In particular, the present disclosure pertains to a system and method for capturing videos and acquiring images of a target area from an aerial vehicle, such as for 2D/3D digital model reconstruction, smoke detection, and the like applications.

An aspect of the present disclosure provides a method for acquiring a set of images of a target area using an aerial vehicle f using a single camera, said method comprising steps of: moving the aerial vehicle over the area of interest along a straight path; capturing a first set of images of an area down below when an optical axis of the camera is directed towards a first side of the straight path such that the optical axis makes a set of first predefined angles with respect to a vertically downward direction of the aerial vehicle; and capturing a second set of images of the area down below when the optical axis of the camera is directed towards a second side of the straight path such that the optical axis makes a set of second predefined angles with respect to the vertically downward direction.

In an implementation, the optical axis of the camera may be perpendicular to a direction of motion of the aerial vehicle.

In another implementation, the optical axis of the camera may be at an angle other than 90 degrees (i.e., non-perpendicular) to a direction of motion of the aerial vehicle.

In an embodiment, the set of first predefined angles and the set of second predefined angles are such that consecutively captured images have an overlap.

In an embodiment, the optical axis of the camera may be perpendicular to a direction of motion of the aerial vehicle.

In an embodiment, the method may include the step of: moving the camera from an extreme right side to an extreme left side, or the extreme right side to the extreme left side and capturing the first set and the second set of images as the camera moves between the two extremes; and further comprises repeating the steps of capturing the first set of images and capturing the second set of images.

In an embodiment, the method may include the step of: moving the camera, before repeating the steps of capturing the first set of images and capturing the second set of images, from the one extreme to the other extreme without taking any images.

In an embodiment, the method may include the step of: positioning of the aerial vehicle at one or more waypoints along the direction of movement of the aerial vehicle and moving the camera in a sweeping action from an extreme first side to an extreme second side, or the extreme second side to the extreme first side and capturing the first set and the second set of images as the camera moves between the two extremes.

In an embodiment, the method may include the step of: positioning of the aerial vehicle at one or more waypoints along the direction of movement of the aerial vehicle and moving the camera in a sweeping action from an extreme first side to an extreme second side, or the extreme second side to the extreme first side and capturing the first set and the second set of images as the camera moves between the two extremes. The steps of capturing the first set of images and capturing the second set of images at the waypoint may be repeated after changing the angle between the optical axis of the camera and the direction of motion of the aerial vehicle, before the aerial vehicle is moved to the next waypoint.

In an embodiment, the step of capturing the first set of images and the second set of images may not need a side overlap between the adjacent images of the first set and the second set 0, as the area covered by the adjacent images is aligned along the adjacent sides.

In an embodiment, the method may include the step of capturing the first set of images and the second set of images such that the adjacent images of each of the first set of images and the second set of images include a side overlap.

In an embodiment, the method may include the step of capturing the first set of images and the second set of images such that the side overlap between the adjacent images of each of the first set of images and the second set of images is adequate only to take care of any error in the movement of the camera between the first side and the second side.

In an embodiment, the method may include the step of: moving the aerial vehicle over the area of interest in parallel straight paths such that the images captured at extreme position of the respective sides during movement of the aerial vehicle along any two adjacent straight paths have a side overlap.

In an embodiment, the side overlap between the images captured at extreme position of the respective sides during movement of the aerial vehicle along any two of the adjacent straight paths is more than the side overlap between the adjacent images of the first and the second set of images captured during movement of the aerial vehicle along any of the straight paths.

In an embodiment, the method may include the step of adjusting, using a ground controller, a percentage of the side overlap between the images captured at extreme ends of the respective sides during movement of the aerial vehicle along any two of the adjacent straight paths and the overlap between the adjacent images captured during movement of the aerial vehicle along any of the straight paths.

In an embodiment, the first side and the second side are left side and right side along wingspan direction of the aerial vehicle.

An aspect of the present disclosure relates to a system for acquiring a set of images of a target area using an aerial vehicle for reconstructing an image for a target area of interest, the system including: a camera movably configured with the aerial vehicle. The camera is configured to: capture, as the aerial vehicle is moving over the area of interest in a straight path, a first set of images of an area down below by pointing an optical axis of the camera towards a first side of the straight path such that the optical axis makes a set of first predefined angles with respect to a vertically downward direction of the aerial vehicle; and capture a second set of images of the area down below by pointing optical axis of the camera towards a second side of the straight path, such that the optical axis makes a set of second predefined angles with respect to the vertically downward direction.

In an aspect, the set of first predefined angles and the set of second predefined angles are such that consecutively captured images have an overlap.

In an embodiment, the camera may be configured with the aerial vehicle such that, during movement of the camera between the first side and the second side, an optical axis of the camera is perpendicular to a direction of motion of the aerial vehicle.

In an embodiment, the system may include a controller configured to control the movement of the aerial vehicle and the camera.

In an embodiment, the system may include a rotary device coupled to the camera to tilt the optical axis of the camera to the set of first predefined angles and the set of second predefined angles with respect to the vertically downward direction.

In an embodiment, the rotary device may be selected from a group comprising a servo motor, a stepper motor, a DC motor and an actuator.

In an embodiment, the controller may be operatively coupled to the rotary device, and configured to tilt the optical axis of the camera to the set of first predefined angles towards the first side and the set of second predefined angles towards the second side during the movement of the aerial vehicle in the straight path such that side overlap between the adjacent images of each of the first set of images and the second set of images is adequate only to take care of any error in the movement of the camera between the first side and the second side.

In an embodiment, the controller may be configured to move the aerial vehicle over the area of interest in parallel straight paths such that the images captured at extreme ends of the respective sides during movement of the aerial vehicle along any two adjacent straight paths have a side overlap, which side overlap is more than the overlap between the adjacent images of each of the first set of images and the second set of images captured during movement of the aerial vehicle along any of the straight paths.

In an embodiment, the controller may be configured to allow adjusting percentages of the overlap between the images captured at extreme ends of the respective sides during movement of the aerial vehicle along any two of the adjacent straight paths and the overlap between the adjacent images of each of the first set of images and the second set of images captured during movement of the aerial vehicle along any of the straight paths.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

FIG. 4A illustrates a typical image capturing technique where images are captured in nadir position.

FIG. 4B illustrates an image capturing technique using a single camera, in accordance with an embodiment of the present disclosure.

FIGS. 5A through 5C illustrate camera field of view (FOV) while at position P1, P2, and effective FOV of the oscillating camera respectively in accordance with an embodiment of the present disclosure.

FIG. 6 illustrates an exemplary side-view representation of motor and camera mounting in accordance with an embodiment of the present disclosure.

FIG. 7 illustrates a process for acquiring images of a target area using an aerial vehicle in accordance with an embodiment of the present disclosure.

DETAILED DESCRIPTION

Figure 1:
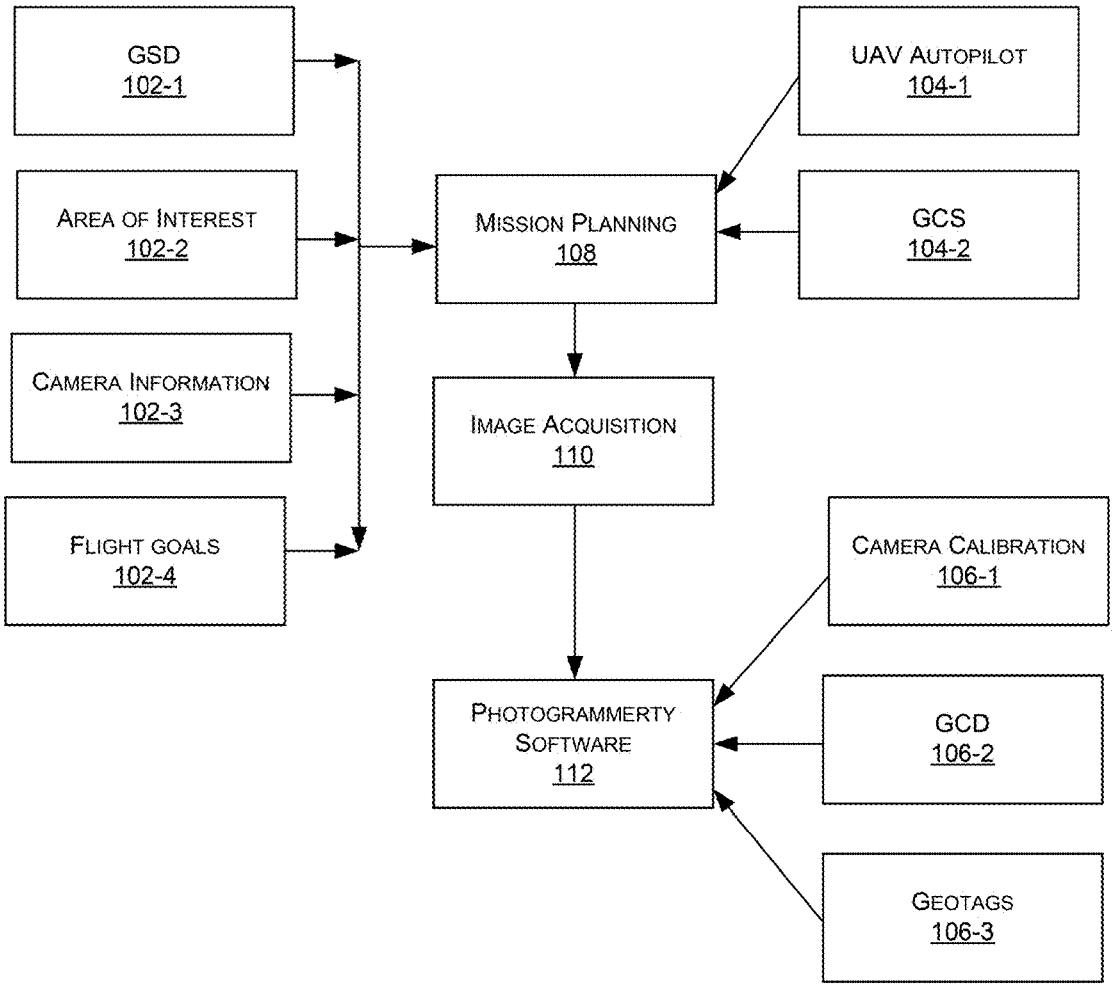
FIG. 1 illustrates an exemplary block diagram showing processing pipeline of the proposed system for image acquisition, in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed.

No language in the specification should be construed as indicating any non-claimed element essential to the practice of the invention.

Various terms as used herein as shown below. To the extent a term used in a claim is not defined, it should be given the broadest definition persons in the pertinent art have given that term as reflected in printed publications and issued patents at the time of filing.

Term 'Aerial Vehicle (AV)' or 'Unmanned Aerial Vehicle (UAV)' as used herein referred to as an aircraft that carries no human pilot or passengers. UAVs—sometimes called "drones"—can be fully or partially autonomous but are more often controlled remotely by a human pilot.

Term 'optical axis' is a line along which there is some degree of rotational symmetry in an optical system such as a camera lens or microscope. The optical axis is an imaginary line that defines the path along which light propagates through the system, up to first approximation. The camera can be tilted along the plane perpendicular to the flite direction to efficiently capture the images.

Term 'field of view (FOV)' as used herein refers to the open observable area that can be captured using the optical device such as camera. In the case of optical devices and sensors, FOV describes the angle through which the devices can pick up electromagnetic radiation.

Embodiments explained herein pertain to a method for capturing videos and/or images of a target area of interest using a single camera mounted on an aerial platform so that the captured images may be used for reconstructing image of the targeted area. In particular, the proposed method is based on use of a single camera, which makes the image capturing apparatus light and suitable for unmanned aerial vehicles that have low load carrying capacity. More particularly, the disclosed method proposes a scheme for image capturing that reduces total flight time of the aerial vehicle over the area of interest. In an aspect, the disclosed method optimizes a side overlap between the captured images, which results in reduction of flight time of the aerial vehicle, thereby resulting in corresponding cost benefits.

In an exemplary embodiment, the disclosed method includes steps of moving the aerial vehicle along a straight flight path and capturing images using a single camera that is configured to capture images by alternately tilting the camera to two sides about an axis perpendicular to the flight path. The camera can be tilted towards left and right and capturing sets of images during the right tilt and the left tilt. Overlap between the left side images and the right side images is optimized to account for any error in the camera movement.

In another aspect, a system for capturing videos and/or images of a target area of interest using a single camera mounted on an aerial platform is disclosed that enables implementation of the disclosed system.

The proposed system and method may acquire videos and images of a large target area from the aerial vehicle, such as for 2D/3D digital model reconstruction, smoke detection in forest applications, and the like applications.

In the context of smoke detection in forest applications using the aerial vehicle, a vast expanse of forest areas may necessitate a comprehensive and thorough approach in monitoring of large coverage area. Due to monitoring of large coverage area, it is imperative that the aerial vehicle cameras capture video footage or images encompassing 100% of the forest area in a fast manner. The camera feeds may enhance a probability of timely smoke detection and response. The dynamic nature of smoke plumes, influenced by wind patterns and environmental conditions, underscores an importance of a holistic visual perspective.

By ensuring complete coverage through video or image capturing, the aerial vehicle may effectively survey an entirety of the forest, minimizing a risk of overlooking potential smoke sources. The requirement for complete coverage is particularly critical in large forested regions where timely detection is pivotal for preventing escalation of fires, safeguarding ecosystems, and protecting human settlements.

The proposed system captures videos or images for 100% or maximum coverage area of the large target area by scanning or sweeping motion with no burden of a narrow path coverage requirement of mapping. The narrow path coverage may refer to a need for the aerial vehicle to follow a specific flight path with a narrower swath width or coverage area. Therefore, achieving higher spatial resolution in the mapped area. In the proposed method, the videos captured or the images acquired need to be overlapped or have proper alignment with consequent images as required for stitching the images for mapping, inspection purpose, or for visual monitoring. Lack of overlap or alignment between the consequently captured images or videos may result in information gaps or distortion in a final map of images or video footage, leading to inaccuracies and incomplete representations of the target area. The proposed method may also be useful for smoke detection through the captured videos by visual monitoring.

Examples of the camera of the aerial vehicle used for video or image capturing may include, but not limited to, a daylight camera, a thermal camera, and the like, with a narrow field of view or a wide field of view. During capturing of maximum area coverage, the camera may tilt or use a pan mechanism. Since the aerial vehicle camera needs to capture maximum coverage area during flight, speed of the flight, the camera orientation/angles (i.e., tilt or pitch angle of the camera) and movements of the camera (i.e., the camera's tilt or pan movement or the aerial vehicle's movements including pitch, roll, and yaw which indirectly provides camera movement) may be accordingly calculated and preprogrammed into the proposed system by considering camera parameters. The camera parameters may include, but not limited to, FOV, shutter speed, focal length, lens distortion, and the like.

FIG. 1 illustrates an exemplary block diagram showing processing pipeline of the proposed system for image acquisition. As shown therein, the image acquisition system requires Ground sample distance (GSD) 102-1, Area of interest 102-2, camera information 102-3, flight goals 102-4, unmanned aerial vehicle autopilot 104-1 and Ground Control Station (GCS) 104-2 for mission planning 108. Further, based on the prepared or generated mission plan 108 image acquisition 110 can be performed. Further, based on the acquired image photogrammetry software 112 can be used for preparing or reconstructing an image of area of interest. Further, attributes such as camera calibration 106-1, Geomorphic Change Detection (GCD) 106-2, and Geotags 106-3 can be used by the photogrammetry software 112 for reconstructing or stitching the acquired image to generate the image of the area of interest 102-2.

Figures 2, 3:
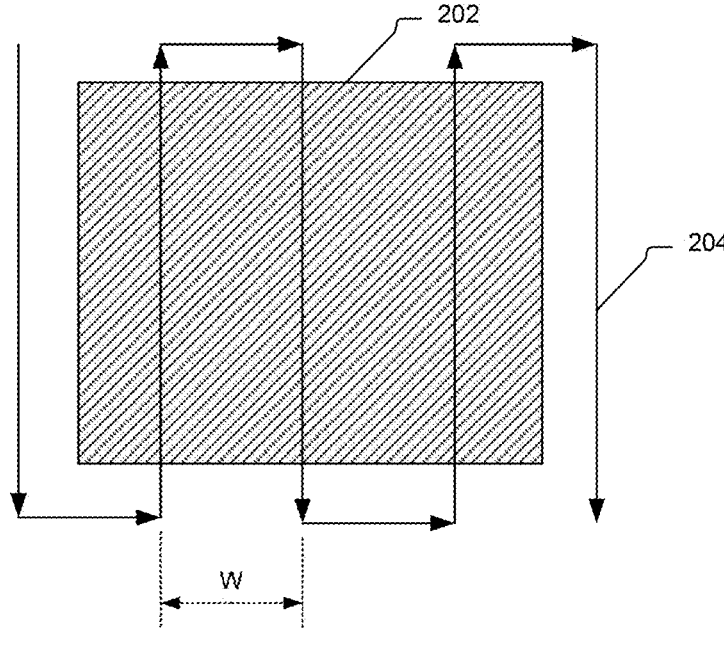
FIG. 2 illustrates an exemplary flight path in accordance with an embodiment of the present disclosure.
FIG. 3 illustrates an exemplary camera oscillating between positions P1 and P2 in accordance with an embodiment of the present disclosure.

FIG. 2 illustrates an exemplary flight path 204 comprising a plurality of parallel tracks (also referred to as straight paths and the two terms used interchangeably hereinafter) of the aerial vehicle over an area of interest 202 (shown as a hatched rectangle). The image acquisition system can control the autopilot 104-1 of the aerial vehicle move in zig-zag manner to make the vehicle travel along the parallel paths so that the area of interest is covered.

In an exemplary embodiment, for a given area of interest (AOI) 202 a flight path for the aerial vehicle (interchangeably referred to as unmanned aerial vehicle (UAV) hereinafter) is to be determined to efficiently cover entire AOI. In an embodiment, a number of tracks/straight paths are determined to enable tracking the complete AOI. The exemplary illustration of FIG. 2 shows 5 tracks. However, it should be noted that number of tracks is inversely proportional to distance between adjacent tracks (w), thus, if distance w between the tracks decreases number of tracks increases, and if the distance w decreases the number of track increases.

It can be easily deduced that if number of tracks decrease then AV travel distance decreases, and if AV travel distance decreases, then the flight time decreases as well. The factors which affect the distance (w) between the tracks include:

1. side overlap percentage requirement;
2. flying altitude or flight height; and
3. camera field of view (FOV)

Side Overlap Percentage Requirement:—If the side overlap percentage decreases then distance (w) between the tracks increases. But since side overlap percentage is an important requirement for the stitching or reconstructing of the images, and hence there is a limitation on an extent that the side overlapping could be decreased.

Flying Altitude (H):—If flying altitude (H) increases then distance (w) between the tracks increases. But flying altitude (H) is limited by GSD constraint. Further, the altitude H has a limitation since, if altitude is increased various attributes such as clarity etc. are highly reduced thereby affecting quality of the final image.

Camera Field of View (FOV):—For a given camera system, the FOV is fixed.

FIG. 3 illustrates an exemplary camera oscillating between positions P1 and P2 in accordance with an embodiment of the present disclosure.

In a typical UAV image capturing technique, where camera 302, mounted on the UAV, is capturing images in the nadir direction with frontal overlap, assuming constant or given UAV speed, Time interval between consecutive images can be Tc Distance between two consecutive images can be Dc In an embodiment, the present disclosure provides a method for oscillating camera 302 between positions P1 and P2 on ground below the UAV, and further capturing sets of images at the P1 and P2 positions. For given UAV speed and frontal overlap percentage requirement, we have Tc and Dc.

In an embodiment, proposed method for acquiring large mapping area images by UAV equipped with the camera 302. The camera 302 can be configured to capture images along a single axis (x-axis) perpendicular to the UAV's flight direction (z-axis) to increase the FOV and reduce the travel distance for mapping large areas. The camera 302 can oscillate/swing along the x-axis between 2 positions (left and right) to capture sets of images. The captured sets of images can then be processed through an image stitching set of instructions to get the final area mapping images.

It would be appreciated by the person skilled in the art that capturing of lateral images perpendicular to the flight path enables covering large FOV compared to capturing the images in nadir position, and hence reduces the travel distance for mapping large areas.

In different implementation, the optical axis (refer FIG. 9B) of the camera may be kept at different angles from the direction of motion (also referred to as flight path, herein) of the aerial vehicle. For example, the optical axis of the camera may be perpendicular to the direction of motion of the aerial vehicle, or may be an angle other than 90 degrees (i.e., non-perpendicular) to a direction of motion of the aerial vehicle.

In another aspect, capturing images on the right side and the left side as the aerial vehicle is moving along a straight path also does away with any requirement of a side overlap between the two sets (hereinafter also referred to as first set of images and second set of images) of images captured on the left side and the right side as the area covered by the first set of images and the second set of images is aligned along the adjacent sides and the captured images can be stitch perfectly enough.

In an embodiment, there can be an overlap between the two sets of images captured on the left side and the right side, which overlap is optimized to account for any error in camera positioning during its movement to the left side and the right side. The optimized overlap, as discussed earlier, increases distance between adjacent parallel straight paths reducing the total number of straight paths, thereby reducing total flight time for capturing the images of the area of interest.

In this invention, there is only one camera mounted on a UAV which oscillates between 2 positions P1 and P2. The camera first tilts to the position P1 (camera tilted by δ/2) and a first image is captured, then the camera oscillates/tilts to the position P2 (camera tilted by −δ/2) and a second image is captured and the camera moves back to the position P1 to repeat the process. Thus, a number of images are captured with the camera in position P1 as the aerial vehicle moves along a track/straight path, and these images are collectively referred to as first set of images. Likewise, images captured from position P2 are referred to as second set of images. The first set of images and the second set of images taken will be with the time period (Tc/2) or (Dc/2). The rotation axis of the camera is parallel to the flight direction, whereas the image capturing axis of the camera is perpendicular to the flight direction. Speed of the aerial vehicle and movement of the camera between the positions P1 and P2 can be synchronized such that there is a frontal overlap between consecutively captured images from the any of the two positions P1 and P2.

Image Capturing Sequence:

a. Move camera to position P1 (at angle δ/2 from the center)
b. Initiate image capture
c. Wait till image capture process is complete
d. Move camera to position P2 (at angle −δ/2 from the center)
e. Repeat step (b) and (c)
f. Go to step (a)

Referring to FIGS. 4A and 4B, it is apparent that L2>L1 where, L1=Distance between the left most and right most edges of 2 consecutive images on ground using existing techniques as displayed by FIG. 4A. L2=Distance between the left most and right most edges of 2 consecutive images on ground using current invention as displayed by FIG. 4B Referring to FIGS. 5A through 5C Field of View (FOV) of a camera is usually defined by angles for the horizontal or vertical component of the FOV. A larger angle translates to a larger field of view, though the resulting image would be highly pixelated. For imaging a large area using a camera with a smaller FOV when at position P1 and P2, and when the camera oscillates between P1 and P2 capturing images, the FOV is combined giving an increased FOV as displayed in FIG. 5c.

Total Effective FOV(EFOV)=FOV+(δ/2+δ/2)

EFOV=FOV+δ (assume δ<FOV)

Thus, FOV has increased by δ

Now flight plan can be computed with EFOV in place of FOV. This will increase distance (w) between the tracks and reduce the number of tracks, reducing UAV travel distance for mapping an area.

$$L=2H \tan(FOV/2)$$

For an example, if FOV=70° and δ=40°. Therefore, EFOV=FOV+δ=110° and assuming H=100 m $$L_{FOV}=2\times100\times\text{Tan}(70°/2)=140 \text{ m}$$

$$L_{EFOV}=2\times100\times\text{Tan}(110°/2)=280 \text{ m}$$

In this method, a 60% increase in the FOV increased the distance (w) between the tracks by 100%. It would be appreciated by the person skilled in the art that the by capturing images by the camera while oscillating between positions P1 and P2 a large section of the AOI can be easily covered and hence in turn the travel distance of the UAV can be reduced almost by 40% by utilizing the current technique.

FIG. 6 illustrates an exemplary side-view representation of motor and camera mounting in accordance with an embodiment of the present disclosure.

Figure 5B:
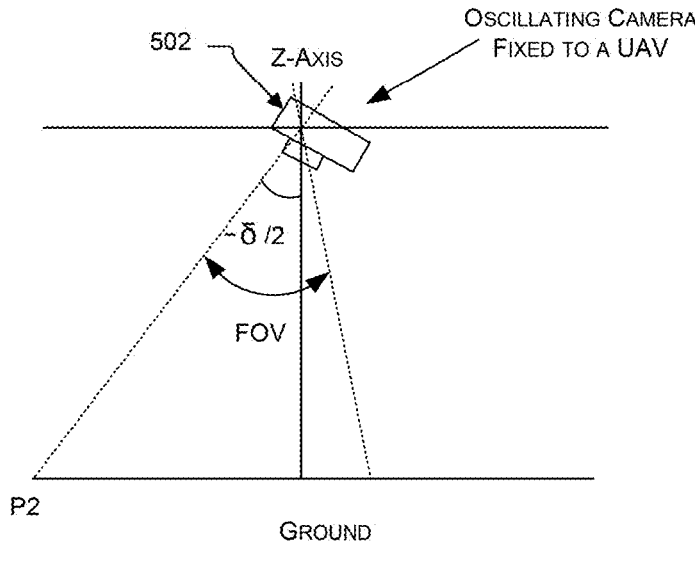
Figure 5C:
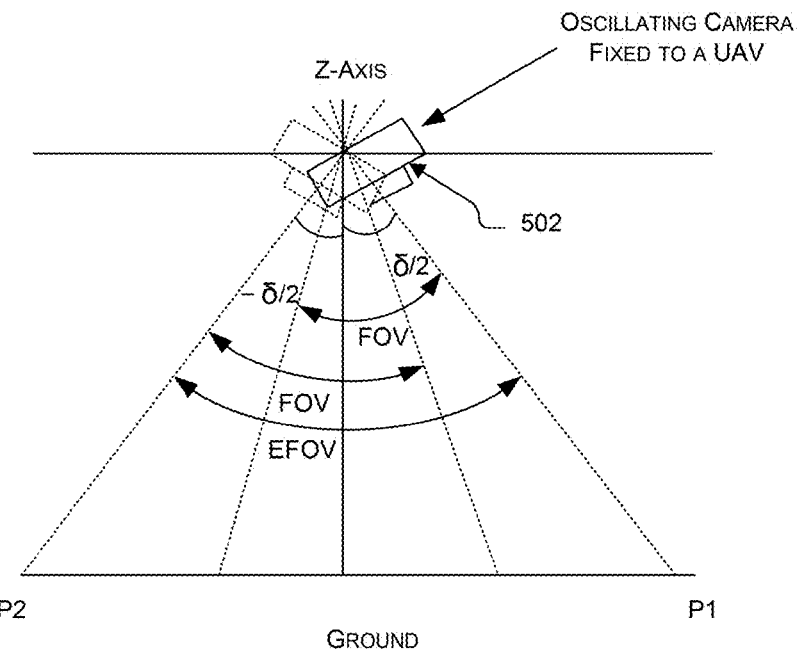

In an embodiment, the current technique could be implemented using an AV 608. The AV 608 can be used for mounting the various components to facilitate capturing of images by camera 602 being mounted over the AV 608, thereby capturing images of entire large area of interest. The AV 608 can include, but not limiting only to a drone, a spider cam etc. for manoeuvring the camera 602 over the large area of interest. The AV 608 can further include an arrangement of a rotary device 604 such as motor operatively coupled to the camera 602 using a shaft 606. The camera 602 is configured such that rotary movement of the rotary device 604 can be configured such that the rotary device can affect the camera 602 to oscillate between positions P1 and P2 (as indicated in FIGS. 5A to 5C). The camera 602 first tilts to the position P1 (camera tilted by δ/2) and a first set of images are captured, then the camera 602 oscillates/tilts to the position P2 (camera tilted by −δ/2) and a second set of images are captured. The first set of images and the second set of images taken will be with the time period (Tc/2) or (Dc/2). The rotation axis of the camera 602 is parallel to the flight direction, whereas the image capturing axis of the camera 602 is perpendicular to the flight direction of the AV 608.

It is to be appreciated that the first set of angles and the second set of angles, (represented by camera tilt of δ/2) are the angles that the optical axis of the camera makes with a vertical plane through the flight path of the aerial vehicle, and has also been referred to as angles that the optical axis of the camera makes with respect to a vertically downward direction of the aerial vehicle, and needs to be interpreted in accordance with the above definition, and to be differentiated with the angle that the optical axis of the camera makes with the flight direction or direction of motion of the aerial vehicle.

Figure 8:
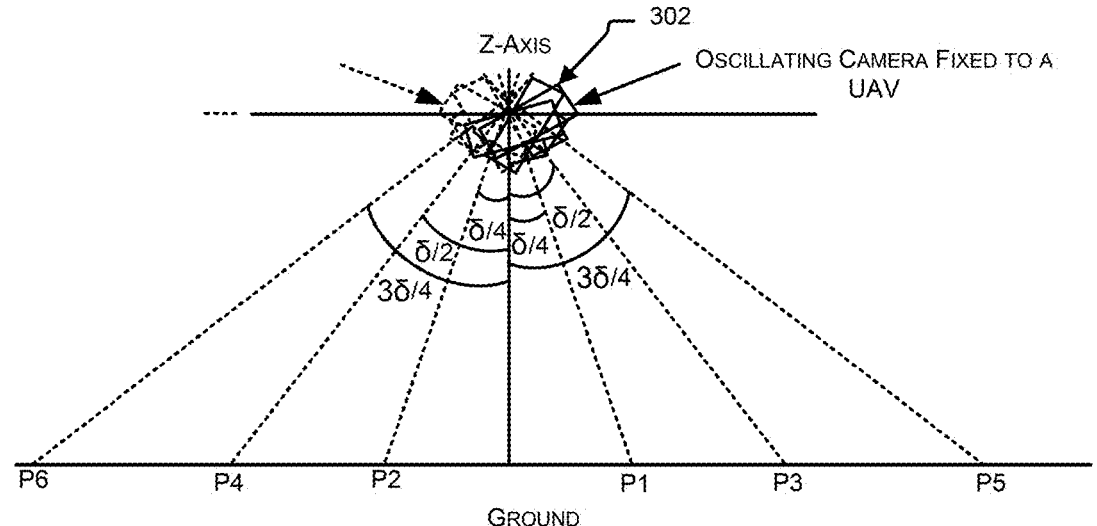
FIG. 8 illustrates a process for acquiring images of a target area using an aerial vehicle, wherein a set of images are captured on each side by moving the optical axis of the camera to a set of predefined angles with respect to a vertically downward direction of the aerial vehicle toward each side, in accordance with an embodiment of the present disclosure.

In an alternate embodiment, a plurality of images can be captured by a sweeping action of the camera from extreme of the first side to extreme of the second side, wherein on each side a plurality of images is captured, as shown in FIG. 8. Alternatively, the camera may be moved to different tilted positions between extreme of the first side and the extreme of the second side for capturing images before being moved to the next tilted position.

In different embodiments, speed of the aerial vehicle along the flight direction can be controlled such that the first set of images and the second set of images captured during consecutive movement of the camera between extremes of the two sides have overlap along the flight direction. In yet another embodiment, the autopilot 104-1 and/or GCC 204-2 (together also referred to as controller, and the terms used interchangeably, herein) can automatically adjust speed of the aerial vehicle with a pre-programmed code to ensure that the captured images have required overlap for image stitching purposes.

In another embodiment, the first set of images and the second set of images can be captured by positioning the aerial vehicle at different waypoint along the flight path, the waypoints chosen such that images captured at consecutive waypoints have overlap along the flight direction.

Figure 9A:
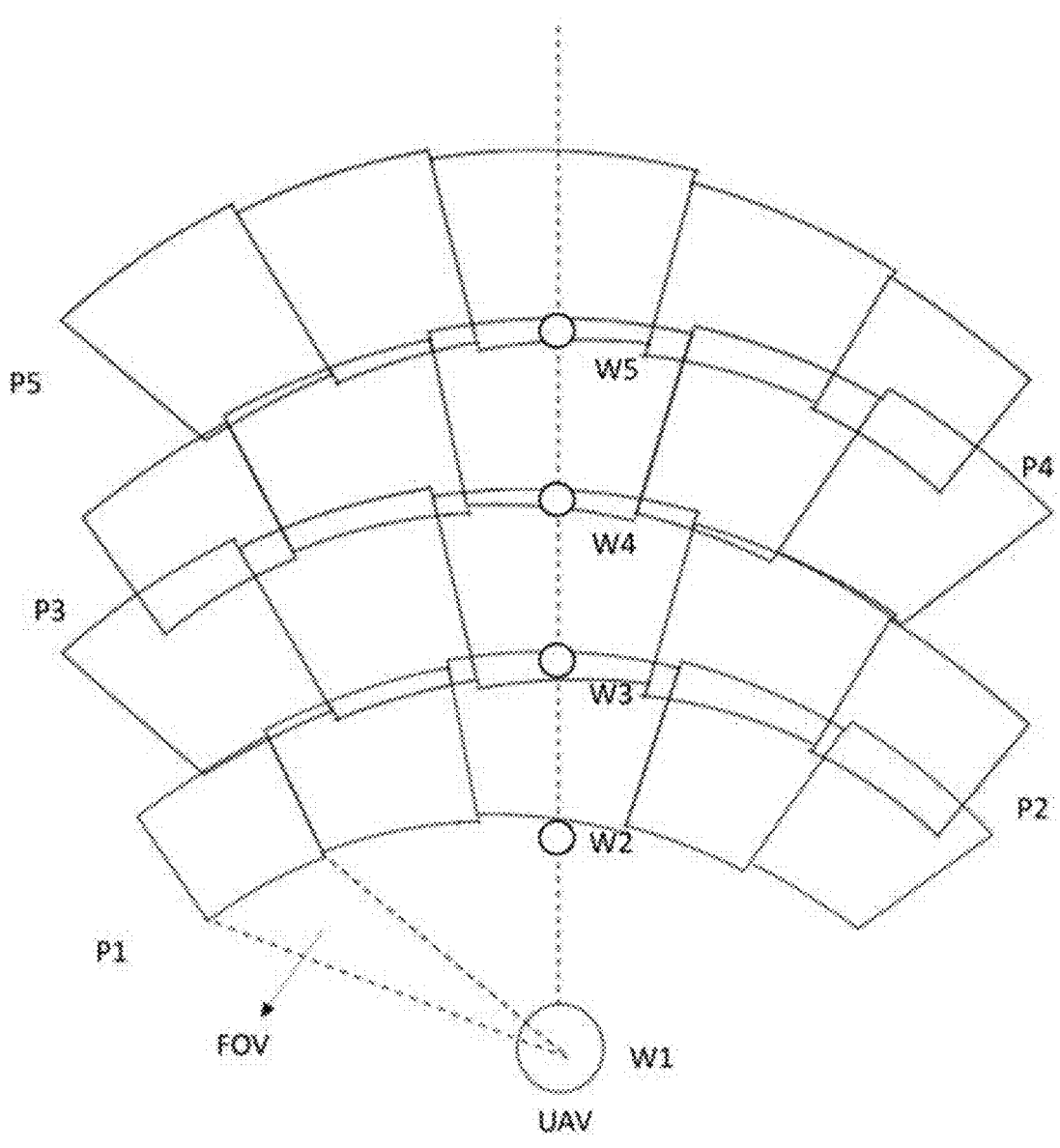
FIGS. 9A-9C illustrate exemplary plan views showing pattern of the images captured of the area down below by the process of FIG. 8, in accordance with an embodiment of the present disclosure.
Figure 9B:
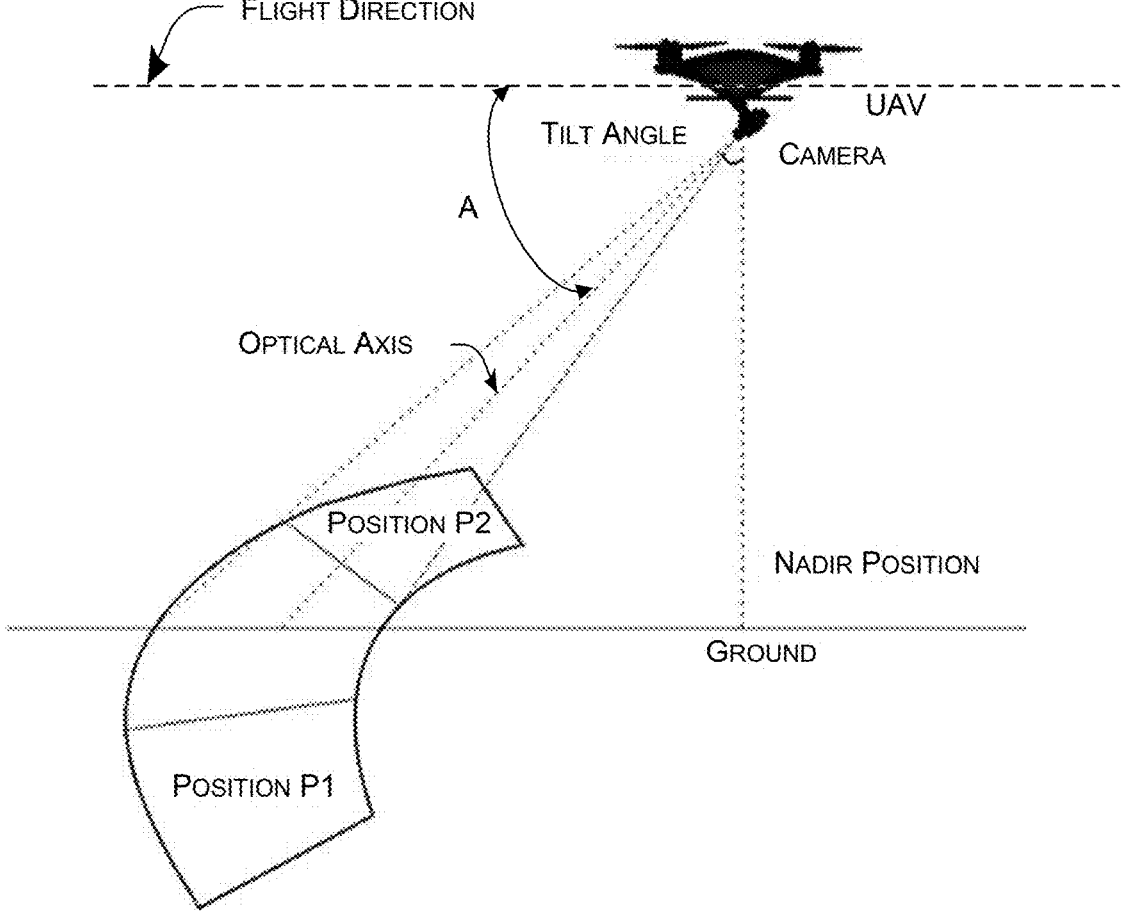

In another embodiment, the aerial vehicle may change the angle (i.e., the angle A, as shown in FIG. 9B, that the optical axis makes with the flight direction) at which the camera captures the first set of images and the second set of images at different waypoints. For example, when the aerial vehicle is at a waypoint 1, the aerial vehicle may capture the images from extreme left to right (i.e., in a sweeping motion) with a first predefine angle that the optical axis makes with the flight direction, and repeat the process after changing the angle A between the optical axis and the flight direction to a second predefine angle, to capture a wider area at the same waypoint, before moving to the next waypoint, i.e., the waypoint 2.

Further, when the aerial vehicle moves to a waypoint 2, the aerial vehicle may similarly capture the images in the sweeping motion with a second set of predefined angles A that the optical axis makes with flight direction. Further, the aerial vehicle may capture the images in different capturing motions which include, but not limited to, sweeping motion, arch, series of linear motion, circle, etc.

As shown in FIG. 8, as the aerial vehicle moving along a straight path, a first set of images of an area down below can be captured when the optical axis of the camera 302 is pointed towards a first side of the aerial vehicle, when the optical axis makes a first set of predefined angles, such as angles δ/4. δ/2, 3δ/4, etc., with respect to a vertically downward direction of the aerial vehicle, as shown in FIG. 8. Further, the camera can continue a sweeping movement towards the second side and capture a second set of images of the area down below when the optical axis of the camera 302 is pointed towards second side of the aerial vehicle and makes a second set of predefined angles, such as angles −β/4. −δ/2, −3δ/4, etc., with respect to the vertically downward direction.

Figure 9C:
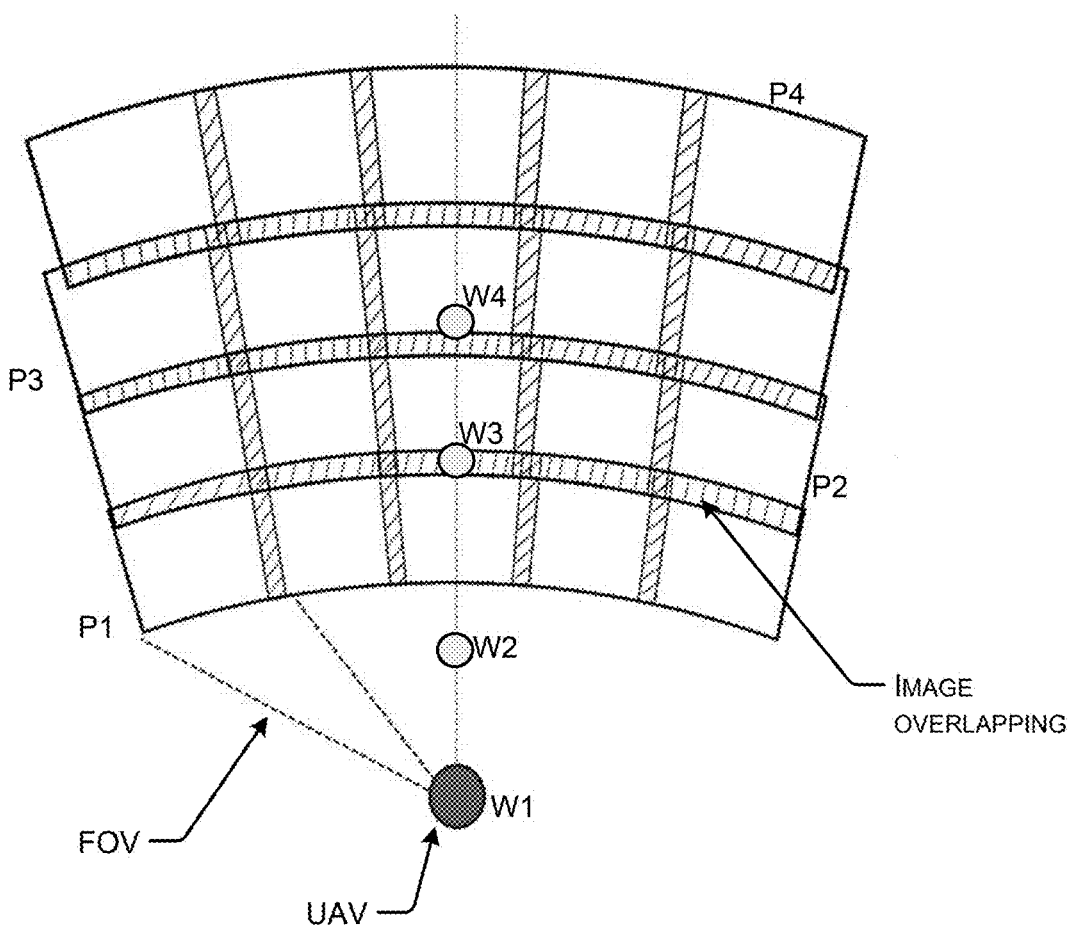

Referring to FIGS. 9A-9C, the process can be repeated during sweeping motion of the camera from extreme of the second side, i.e., the largest angle of the second set of predefined angles, to the extreme of the first side, i.e., the largest angle of the first set of predefined angles. However, as evident from FIG. 8, capturing of the images during movement of the camera from extreme of the second side to the extreme of the first side shall lead to a lot of overlap. Therefore, in a preferred embodiment, the camera can be moved from the second side extreme to the first side extreme without taking any images.

In an embodiment, when the aerial vehicle is moving, the images are captured during left-to-right movement and right-to-left movement of the camera as shown in FIG. 9A. With respect to FIG. 9A, the aerial vehicle is mounted with a single camera, and starts flight from a waypoint W1. The aerial vehicle's camera captures images at an axis perpendicular to the flight direction of the aerial vehicle, at a tilt angle, and moves from a position P1 to position P2 capturing multiple images in-between as the aerial vehicle moves. When the camera completes capturing images from the position P1 to the position P2 and reaches waypoint W2, the camera again starts capturing the images from the position P2 to the next position P3. The process of capturing the images is repeated at different waypoints.

In another embodiment, with respect to FIG. 9B, the camera of the aerial vehicle captures multiple images in the sweeping motion at any angle (in any direction i.e., forward, backward, right, left etc.) to increase a field of view and reduce a travel distance for mapping large areas. The camera captures multiple images along an X-axis perpendicular to the flight direction of the aerial vehicle in a sweeping motion from left to right and right to left while in motion. The captured images are then processed through an image stitching program to get final area mapping images.

In another embodiment, the aerial vehicle changes the angle at which the camera captures multiple images at different waypoints based on the requirement of the application for which the aerial vehicle is capturing images. In another embodiment, the camera makes use of a combination of angles for capturing the multiple images while hovering or in flight. The speed of the UAV is automatically adjusted to capture the images at any angle.

In another embodiment, the camera captures multiple images sequentially one after another with overlap while moving from position P1 to position P2 as shown in FIG. 9C. The number of images captured between the two positions P1 and P2 may vary every time and may be programmed accordingly.

FIG. 7 illustrates an exemplary flow diagram showing different steps involved in the disclosed method for acquiring images of a target area using an aerial vehicle.

In an aspect, the proposed method may be described in general context of computer executable instructions. Generally, computer executable instructions can include routines, programs, objects, components, data structures, procedures, modules, functions, etc., that perform particular functions or implement particular abstract data types. The method can also be practiced in a distributed computing environment where functions are performed by remote processing devices that are linked through a communications network. In a distributed computing environment, computer executable instructions may be located in both local and remote computer storage media, including memory storage devices.

The order in which the method as described is not intended to be construed as a limitation, and any number of the described method blocks may be combined in any order to implement the method or alternate methods. Additionally, individual blocks may be deleted from the method without departing from the spirit and scope of the subject matter described herein. Furthermore, the method may be implemented in any suitable hardware, software, firmware, or combination thereof. However, for ease of explanation, in the embodiments described below, the method may be considered to be implemented in the above described system.

Referring back to FIG. 7, the method 700 can include, as at block 702, moving the aerial vehicle along a straight path. At block 704 of the method 700, a first set of images of an area down below can be captured by pointing an optical axis of the camera, such as camera 302 shown in FIG. 8, towards a first side of the aerial vehicle, such that the optical axis makes a first set of predefined angles, such as angles $\delta/4$, $\delta/2$, $3\delta/4$, etc., with respect to a vertically downward direction of the aerial vehicle. Further, at block 706, the method 700 can include the step of capturing a second set of images of the area down below by pointing the optical axis of the camera 302 towards second side of the aerial vehicle such that the optical axis makes a second set of predefined angles, such as angles $-\delta/4$, $-\delta/2$, $-3\delta/4$, etc., with respect to the vertically downward direction. The camera 302 can be configured with the aerial vehicle such that, during movement of the camera between the first side and the second side, an optical axis of the camera is perpendicular to a direction of motion of the aerial vehicle.

The first set of images and the second set of images can be captured by moving the camera in a sweeping action from extreme of the first side, i.e., the largest angle of the first set of predefined angles, to extreme of the second side, i.e., the largest angle of the second set of predefined angles. The step of capturing the first set of images and the second set of images can be characterized by absence of need of a side overlap between the adjacent images captured during the sweeping movement of camera, as the area covered by the captured images is aligned along the adjacent sides.

The method 700 can further include the step of capturing the images such that side overlap between the adjacent images captured sweeping action of the camera is adequate only to take care of any error in the movement of the camera, thereby resulting in an optimized overlap to reduce the flight time of the vehicle as discussed earlier.

The method 700 can further include the step of moving the aerial vehicle over the area of interest in parallel straight paths, such as shown in FIG. 2, such that the images captured at extreme positions of the respective sides during movement of the aerial vehicle along any two adjacent straight paths have a side overlap.

The method 700 can further include the step of adjusting, using a ground control station, such as ground control station 104-2 shown in FIG. 1, a percentage of the side overlap between the images captured at extreme positions of the respective sides captured during movement of the aerial vehicle along any two of the adjacent straight paths and the overlap between the adjacent images captured during movement of the aerial vehicle along any of the straight paths.

The first side and the second side can be left side and right side along wingspan direction of the aerial vehicle.

In implementation, the camera 302 can be a high-resolution camera.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE PRESENT DISCLOSURE

The present disclosure provides an economical and simple to implement method for acquiring images of large target area from an aerial platform.

The present disclosure provides a system method for acquiring images of large target area with a single camera by moving the camera along the flight path adapted to cover the entire area of interest.

The present disclosure provides an economical and simple to implement method for acquiring images of large target area from an aerial platform with a single camera.

The present disclosure provides a system and method for capturing images along an axis perpendicular to the flight path of the aerial vehicle.

The present disclosure provides a system and method for capturing images to that reduces flight time for 2D/3D digital model reconstruction of a large area of interest.

The present disclosure provides a system and method for capturing images that reduces the flight time of the UAV for mapping a large target area, such as for smoke detection.

The invention claimed is:

1. A method for acquiring a set of images of a target area of interest using an aerial vehicle, said method comprising:
  moving the aerial vehicle over the area of interest along a straight path;
  capturing a first set of images of an area down below with an optical axis of a camera directed towards a first side of the straight path such that the optical axis makes a set of first predefined angles with respect to a vertically downward direction of the aerial vehicle; and
  capturing a second set of images of the area down below with the optical axis of the camera directed towards a second side of the straight path such that the optical axis makes a set of second predefined angles with respect to the vertically downward direction;
  wherein the first set of images and the second set of images are captured as the camera undergoes a sweeping action between an extreme first side and an extreme second side.

2. The method as claimed in claim 1, wherein the optical axis of the camera is at an angle 90 degrees or less to a flight direction of the aerial vehicle.

3. The method as claimed in claim 2, wherein the set of first predefined angles and the set of second predefined angles are such that consecutively captured images have an overlap.

4. The method as claimed in claim 2, wherein the method comprises: moving the camera in the sweeping action from the extreme first side to the extreme second side, or the extreme second side to the extreme first side and capturing the first set and the second set of images as the camera moves between the two extremes; and further comprises repeating the steps of capturing the first set of images and capturing the second set of images as the aerial vehicle moves along the straight path.

5. The method as claimed in claim 2, wherein the method comprises: moving the camera, before repeating the steps of capturing the first set of images and capturing the second set of images, from the one extreme to the other extreme without taking any images.

6. The method as claimed in claim 2, wherein the method comprises: positioning of the aerial vehicle at one or more waypoints along the flight direction of the aerial vehicle and moving the camera in the sweeping action from the extreme first side to the extreme second side, or the extreme second side to the extreme first side and capturing the first set and the second set of images as the camera moves between the two extremes.

7. The method as claimed in claim 2, wherein the method comprises: positioning of the aerial vehicle at one or more waypoints along the flight direction of the aerial vehicle and moving the camera in the sweeping action from the extreme first side to the extreme second side, or the extreme second side to the extreme first side and capturing the first set and the second set of images as the camera moves between the two extremes; and further comprises: repeating capturing the first set of images and capturing the second set of images at the one or more waypoints after changing the angle between the optical axis of the camera and the flight direction of the aerial vehicle.

8. The method as claimed in claim 2, wherein capturing the first set of images and the second set of images is characterized by absence of need of a side overlap between the adjacent images of the first set and the second set of images, as the area covered by the adjacent images is aligned along the adjacent sides.

9. The method as claimed in claim 2, comprising capturing the first set of images and the second set of images such that the adjacent images of the first set of images and the second set of images include a side overlap.

10. The method as claimed in claim 9, comprising capturing the first set of images and the second set of images such that the side overlap between the adjacent images of each of the first set of images and the second set of images is adequate only to take care of any error in the movement of the camera between the first side and the second side.

11. The method as claimed in claim 9, wherein the method comprises: moving the aerial vehicle over the area of interest in parallel straight paths such that the images captured at extreme positions of the respective sides during movement of the aerial vehicle along any two adjacent straight paths have a side overlap.

12. The method as claimed in claim 10, wherein the side overlap between the images captured at extreme positions of the respective sides during movement of the aerial vehicle along any two of the adjacent straight paths is more than the side overlap between the adjacent images of each of the first set of images and the second set of images captured during movement of the aerial vehicle along any of the straight paths.

13. The method as claimed in claim 10, comprising adjusting, using a ground controller, a percentage of the side overlap between the images captured at extreme ends of the respective sides during movement of the aerial vehicle along any two of the adjacent straight paths and the overlap between the adjacent images captured during movement of the aerial vehicle along any of the straight paths.

14. The method as claimed in claim 2, wherein the first side and the second side are left side and right side along wingspan direction of the aerial vehicle.

15. A system for acquiring a set of images of a target area of interest using an aerial vehicle, said system comprising:
  a camera movably configured with the aerial vehicle, wherein said camera is configured to:
    capture, as the aerial vehicle is moving over the area of interest in a straight path, a first set of images of an area down below by pointing an optical axis of the camera towards a first side of the straight path such that the optical axis makes a set of first predefined angles with respect to a vertically downward direction of the aerial vehicle; and
    capture a second set of images of the area down below by pointing optical axis of the camera towards a second side of the straight path, such that the optical axis makes a set of second predefined angles with respect to the vertically downward direction;
  wherein the first set of images and the second set of images are captured as the camera undergoes a sweeping action between an extreme first side and an extreme second side; and wherein the set of first predefined angles and the set of
second predefined angles are such that consecutively
captured images have an overlap.

16. The system as claimed in claim 15, wherein the
camera is configured with the aerial vehicle such that, during
movement of the camera between the first side and the
second side, the optical axis of the camera is at an angle 90
degrees or less to a flight direction of the aerial vehicle.

17. The system as claimed in claim 16, wherein the
system comprises a controller configured to control the
movement of the aerial vehicle and the camera.

18. The system as claimed in claim 16, wherein the
system comprises a rotary device coupled to the camera to
tilt the optical axis of the camera to the set of first predefined
angles and the set of second predefined angles with respect
to the vertically downward direction.

19. The system as claimed in claim 18, wherein the rotary
device is selected from a group comprising a servo motor, a
stepper motor, a DC motor, and an actuator.

20. The system as claimed in claim 18, wherein the
controller is operatively coupled to the rotary device, and
configured to tilt the optical axis of the camera to the set of
first predefined angles towards the first side and the set of
second predefined angles towards the second side during the movement of the aerial vehicle in the straight path such that
side overlap between the adjacent images of each of the first
set of images and the second set of images is adequate only
to take care of any error in the movement of the camera
between the first side and the second side.

21. The system as claimed in claim 17, wherein the
controller is configured to move the aerial vehicle over the
area of interest in parallel straight paths such that the images
captured at extreme ends of the respective sides during
movement of the aerial vehicle along any two adjacent
straight paths have a side overlap, which side overlap is
more than the overlap between the adjacent images of each
of the first set of images and the second set of images
captured during movement of the aerial vehicle along any of
the straight paths.

22. The system as claimed in claim 20, wherein the
controller is configured to allow adjusting a percentage of
the overlap between the images captured at extreme ends of
the respective sides during movement of the aerial vehicle
along any two of the adjacent straight paths and the overlap
between the adjacent images of each of the first set of images
and the second set of images captured during movement of
the aerial vehicle along any of the straight paths.

* * * * *